United States Patent
Steele et al.

(10) Patent No.: US 6,420,797 B1
(45) Date of Patent: Jul. 16, 2002

(54) ELECTRICAL/ELECTRONIC SYSTEM ARCHITECTURE

(76) Inventors: Robert Edward Steele, 312 Greenbriar Dr., Cortland, OH (US) 44410; Theodore Raymond Schmidt, 8877 Turner Mullen Rd., Kinsman, OH (US) 44428-9538; Ronald P. Albanese, 408 Hawthorne Trail, Cortland, OH (US) 44410; Christopher C. Chandler, 4755 Logan Arms Dr., Youngstown, OH (US) 44505; Andrew Frank Rodondi, 3840 Orangeville Rd., Sharpsville, PA (US) 16150; David Allen Robinson, 3394 S. CO Rd. 1380 E., Kirklin, IN (US) 46050; Victor Mendez, 3549 Kody Ct., Kokomo, IN (US) 46902

( * ) Notice: Subject to any disclaimer, the term of this patent is extended or adjusted under 35 U.S.C. 154(b) by 0 days.

(21) Appl. No.: 09/252,415

(22) Filed: Feb. 18, 1999

Related U.S. Application Data

(60) Provisional application No. 60/075,144, filed on Feb. 19, 1998.

(51) Int. Cl.[7] ................................................. H02G 3/00
(52) U.S. Cl. ....................... 307/9.1; 307/10.1; 307/10.3; 307/10.6; 307/10.8; 701/36
(58) Field of Search ................. 307/9.1, 10.1; 174/42 A; 370/10.3, 10.6, 40.8; 701/36

(56) References Cited

U.S. PATENT DOCUMENTS

| | | | | |
|---|---|---|---|---|
| 4,594,571 A | * | 6/1986 | Neuhaus et al. | 340/52 F |
| 4,942,571 A | * | 7/1990 | Moller et al. | 370/58.1 |
| 5,808,371 A | * | 9/1998 | Kon'l et al. | 307/10.1 |

* cited by examiner

Primary Examiner—Kim Huynh
Assistant Examiner—Robert L. Deberadinis
(74) Attorney, Agent, or Firm—Thomas N. Twomey

(57) ABSTRACT

An electrical/electronic system architecture for a vehicle includes a plurality of regions partitioning the vehicle, with each region having a regional electrical/electronic controller (REEC) and at least one local network partitioning each region, with each local network having an electrical/electronic device. The electrical/electronic system architecture includes a global power distribution network that distributes power from a power source to the REEC within each region and a regional power distribution system that distributes the power from the REEC to the local network. The electrical/electronic system architecture also includes a global communication network that provides serial data communication between the REECs in the regions and a regional communication network communicating with the global communication network, such that the regional communication network provides data communication between the REEC and the local network within the region.

25 Claims, 5 Drawing Sheets ically oriented features within the motor vehicle.
ELECTRICAL/ELECTRONIC SYSTEM ARCHITECTURE The present invention claims the priority date of U.S. Provisional Patent Application Ser. No. 60/075,144 filed Feb. 19, 1998 abandoned.

BACKGROUND OF THE INVENTION

1. Field of the Invention

The present invention relates generally to electrical and electronic system architecture and, more particularly, to an electrical and electronic system architecture for a motor vehicle.

2. Description of the Related Art

Vehicles, and in particular an automotive vehicle, contain many electronically controlled features. Many of these features are independent, while others are functionally integrated. Some of these features relate to the operation of the vehicle, including the powertrain and brake system, while others enhance occupant convenience, such as power seats, heated seats, remote keyless entry and automatic temperature control. Typically, the operation of these features is controlled by a functionally specific electronic controller. An example of an electronic controller is an engine controller that functionally controls the engine and engine-related systems, or a body controller that functionally controls body-related systems.

The electronic controller is typically a microprocessor having processing circuitry, input biasing and protection circuitry and output power switching capability. The electronic controller controls a function specific electronic device, such as a sensor or actuator. The electronic device is electrically interconnected with the electronic controller by a conductor. A typical conductor is a copper wire coated with an insulating material. Another type of conductor is a flexible printed circuit board. Depending on the locations of the electronic device or the electronic controller in the vehicle, a large quantity of parallel conductors, including individual wires, large bundles of wires, or flexible circuits may be routed throughout the vehicle.

As is well understood in the art, electrical/electronic system architecture refers to the organization and interrelationship of the electrical/electronic features of the vehicle. As more sophisticated electronically operated features are being utilized in vehicles, the electrical/electronic system architecture is likewise increasing in complexity. For example, a luxury-oriented vehicle could contain over thirty electronic controllers. This greatly increases the complexity and packaging requirements of the electrical/electronic system architecture. While an electrical/electronic system architecture based on functionally distributed electronic controllers worked well in the past, it is desirable to increase the flexibility given the popularity of electronically oriented features in today's motor vehicles. Thus, there is a need in the art for an electrical/electronic system architecture that is based on physically distributed electronic controllers to provide greater flexibility in the design and operation of electrical/electronic features within the motor vehicle.

SUMMARY OF THE INVENTION

Accordingly, the present invention is an electrical/electronic system architecture for a motor vehicle. The electrical/electronic system architecture includes a plurality of regions partitioning the vehicle, with each region having a regional electrical/electronic controller (REEC) and at least one local network partitioning each of the regions, with the local network having an electrical/electronic device. The electrical/electronic system architecture includes a global power distribution network that distributes power from a power source to the REEC within each of the regions and a regional power distribution system that distributes power from the REEC to the at least one local network within each region. The electrical/electronic system architecture also includes a global communication network that provides serial data communication between the REECs in the regions and a regional communication network communicating with the global communication network, such that the regional communication network provides data communication between the REEC and the local network within the region.

One advantage of the present invention is that an electrical/electronic system architecture is provided for a vehicle that has increased flexibility and reduced complexity. Another advantage of the present invention is that the electrical/electronic system architecture physically partitions the vehicle into regions, with each region assigned a specific electronic controller. Still another advantage of the present invention is that the electrical/electronic system architecture has a regional electrical/electronic controller that controls power distribution, circuit protection, communication and computation within the region. Yet another advantage of the present invention is that the electrical/electronic system architecture performs high speed serial communication and distributed computing between regions. A further advantage of the present invention is that the electrical/electronic system architecture low speed serial communication and distributed power switching takes place within a region. Still a further advantage of the present invention is that the electrical/electronic system architecture uses fewer electrical/electronic components, including wiring, bussed electrical centers, and input/output devices.

Other features and advantages of the present invention will be readily appreciated as the same becomes better understood after reading the subsequent description when considered in connection with the accompanying drawings.

DETAILED DESCRIPTION OF THE PREFERRED EMBODIMENTS

Figure 1:
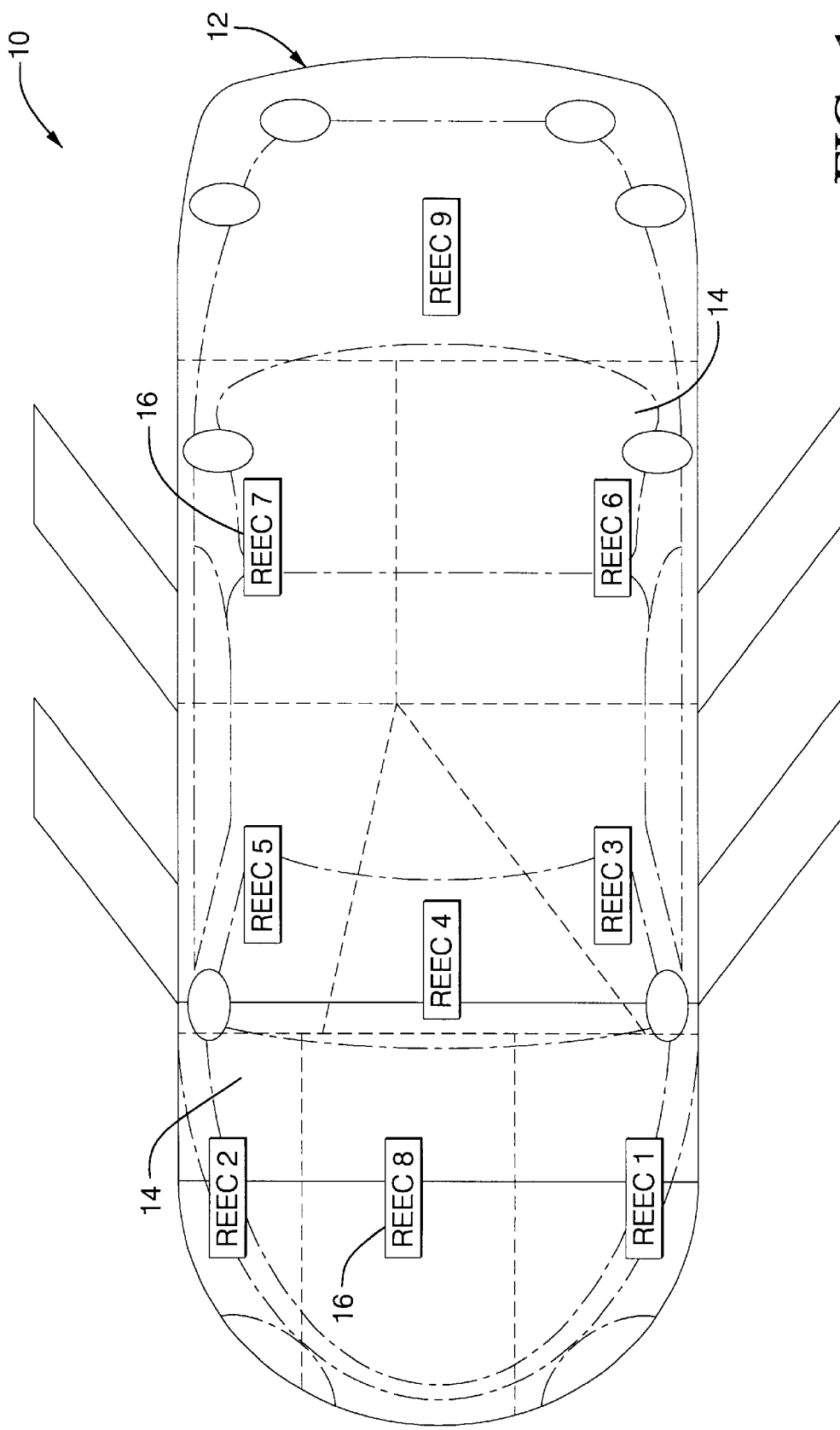
FIG. 1 is a top view of an electrical/electronic system architecture, according to the present invention, illustrated in operational relationship with a vehicle.

Referring to FIGS. 1 through 5, one embodiment of an electrical/electronic system architecture 10 according to the present invention, is shown for a vehicle 12 such as an automotive vehicle. The electrical/electronic system architecture 10 physically partitions the vehicle 12 into a plurality of discrete regions 14, in this example, there are nine (9). The role of the region 14 within the electrical/electronic system architecture 10 is to facilitate regional power distribution, global and regional communication, and global and regional computing. To accomplish these functions, each region 14 includes a controller 16, referred to as a regional electrical/electronic controller, or REEC. The architecture 10 include a global communication line 54 (FIG. 5), as will be discussed. Advantageously, the REEC's 16 for each region 14 are in electrical communication.

Figure 6:
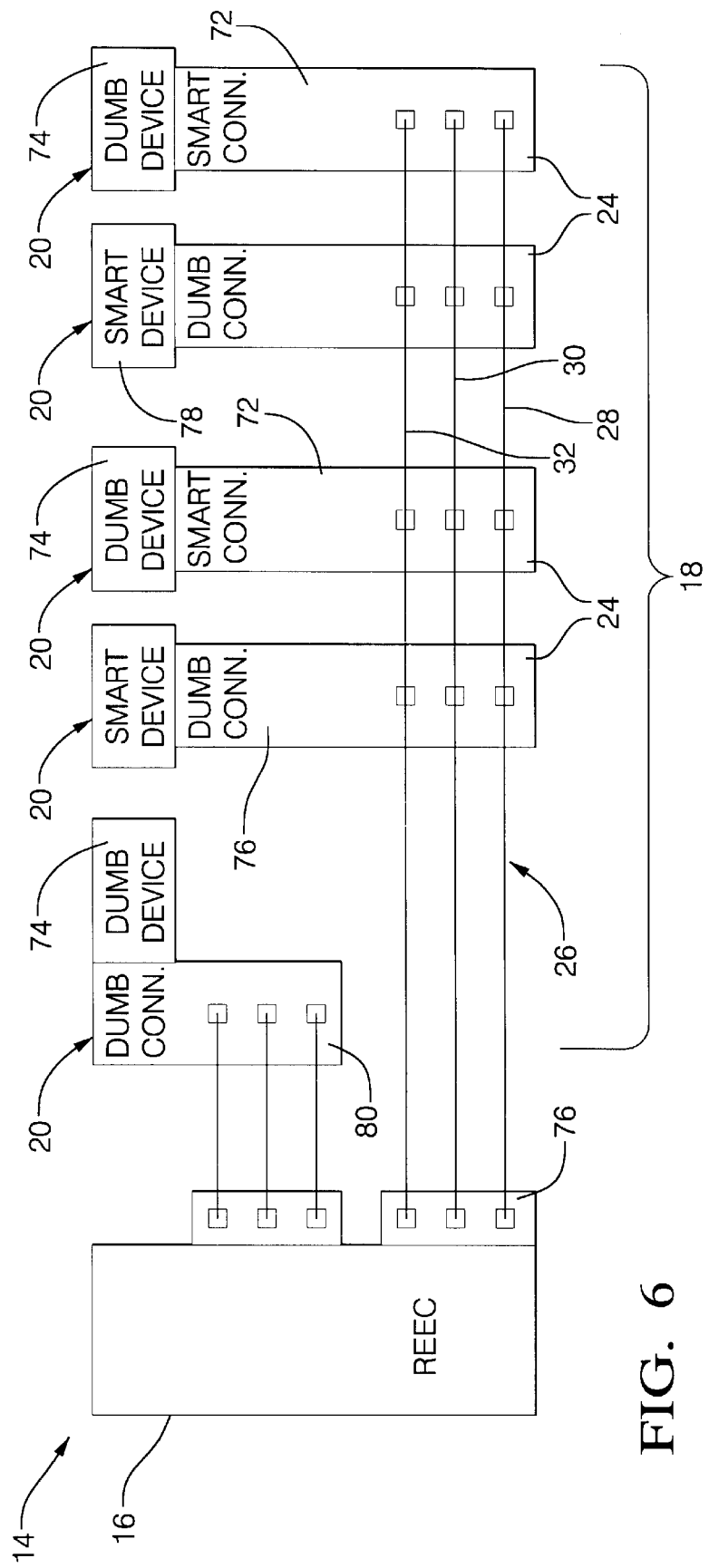
FIG. 6 is a block diagram of a multi-drop construction, according to the present invention, of the electrical/electronic system architecture of FIG. 1.

The architecture 10 may include at least one local network 18, as best illustrated in FIG. 6. The local network 18 includes electrical/electronic devices 20 such as sensors, switches, actuators or connectors. It should be appreciated that the number of local networks 18 is dependent on several factors, such as the number of electrical/electronic features within that region 14 of the vehicle 12.

The architecture 10 may include at least one node 24. An example of a node 24 includes a switch, sensor, actuator, motor, or lamp that operates the electrical/electronic feature within that particular region. The node 24 may be part of the local network 18, or directly connected to the REEC 16 if the data rate requirements exceed the local network 18 capability. In this example, the local network 18 could contain up to ten nodes 24.

The local network 18 is connected electrically to the controller 16 within the region 14 a bus 26. In this example, the bus 26 is a three wire or line bus having a power line 28, a grounding line 30 and a serial data communication line 32 a illustrated in FIGS 4 and 6. The local network 18 and corresponding nodes 24 may be connected to the bus 26 using a multi-drop construction method, to be discussed. Advantageously, each bus 26 provides bi-directional communication between each node 24 and REEC 16. An example of a bi-directional communication protocol known in the art is Universal Asynchronous Receiver Transmitter (UART). Another example of bi-directional communication is disclosed in a commonly assigned paten application entitled, "Vehicle Serial Data Bus Communication Protocol and Method," Ser. No. 09/200,164, filed Nov. 25, 1998. It should be appreciated that the bus 26 is conventional and known in the art, although the application thereof is not. a preferred method, the number and type of electrical/electronic features on the motor vehicle 12 determines the total number of nodes 24 required. Each node 24 may require that its data be shared with all of the regions 14 via a global communication line 54 to be discussed. However, electrical loading and response time constraints may limit the number of nodes 24 that can be placed on the bus 26; therefore, only a predetermined number of buses 26 are available for each REEC 16. Additional vehicle 12 data is calculated and distributed using parallel processing by each REEC 16 and is communicated to other REECS 16. The total required computational power of the electrical/electronic system architecture 10 depends on the total amount of vehicle 12 data, as determined from the total number of nodes 24, the amount of data per node 24, calculated data, and the data communication needs. Therefore, the number of REECs 16 is determined from the total required computational power divided by the computing power capability of the REEC 16 used in each region 14.

The positioning of the REEC 16 within the region 14 can minimize wiring complexity and improve the flexibility of the electrical/electronic system architecture 10. One factor in positioning the REEC 16 is physical accessibility to the REEC 16. Another factor is how the vehicle 12 is assembled. Advantageously, the partitioning of the motor vehicle 12 into regions 14 increases the opportunity for modular assembly of the vehicle 12.

Figure 2:
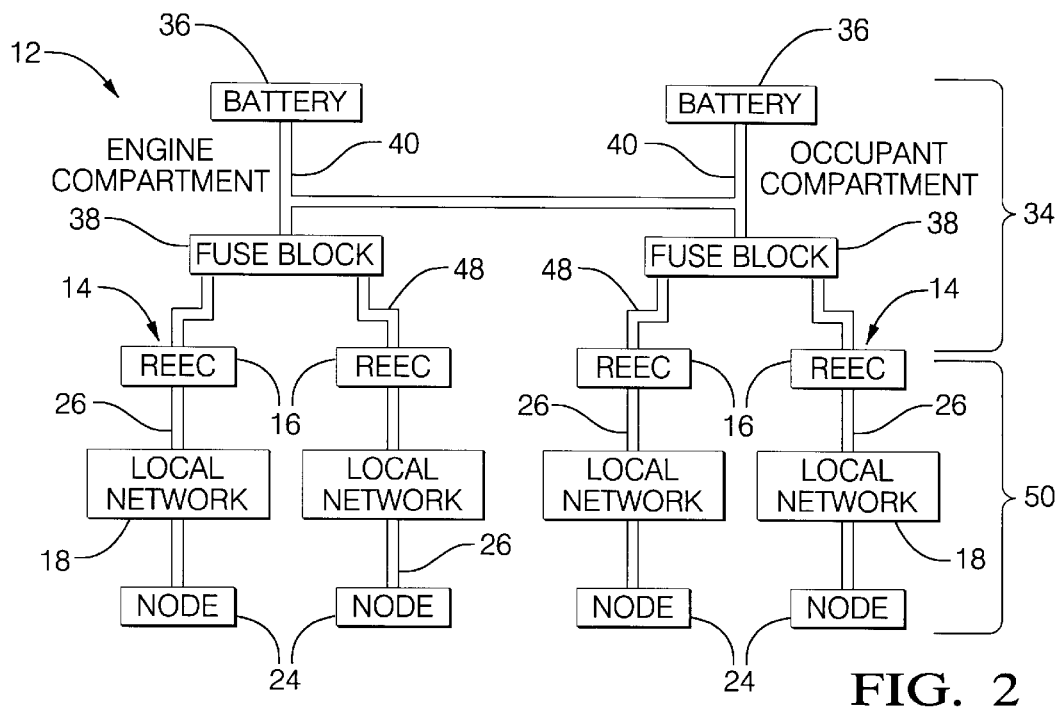
FIG. 2 is a block diagram of a power distribution network, according to the present invention, of the electrical/electronic system architecture of FIG. 1.
Figure 3:
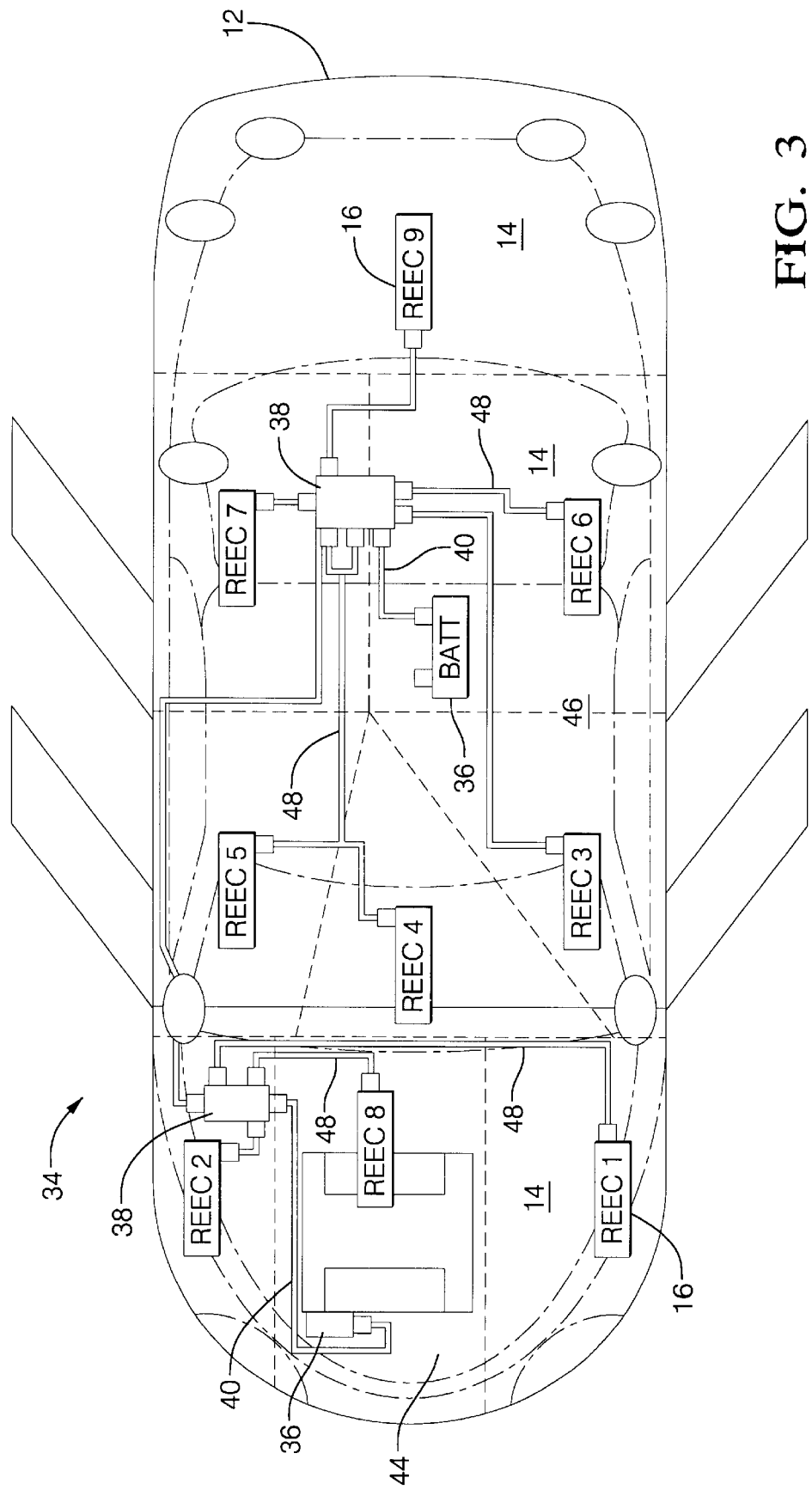
FIG. 3 is a top view of the power distribution network for the electrical/electronic system architecture of FIGS. 1 and 2, illustrated in operational relationship with the vehicle.

Referring to FIGS. 2 and 3, the electrical/electronic system architecture 10 includes a global power distribution network 34 that distributes power to all the regions 14 of the vehicle 12. The global power distribution network 34 includes a power source 36, such as a battery. It should be appreciated that there could be more than one battery. The global power distribution network 34 includes a global circuit protection device 38 and a first power feed 40. The power is transferred from the primary power source 36 to the global circuit protection device 38 by the first power feed 40, which may be a wire cable. The global circuit protection device 38 has a plurality of global circuit protection elements (not shown) operably connected to it. In this example, the global circuit protection device 38 is a fuseblock and the global circuit protection element is a high current fuse, as is known in the art. Preferably, there are two fuseblocks 38, one located within the engine compartment 44 of the vehicle 12 and the other positioned within an occupant compartment 46 of the vehicle 12. The number of fuses connected to the fuseblock 38 is related to the number of REECs 16, which is related to the electrical/electronic features on the vehicle 12. The global power distribution network 34 includes a second power feed 48 to distribute power to each region 14. The second power feed 48 interconnects the fuseblock 38 and the REEC 16. It should be appreciated that, in this example, a conventionally known "star" configuration (not shown) is used to electrically connect the first power feed 40 to each fuse in the fuseblock 38.

The electrical/electronic system architecture 10 includes a regional power distribution network 50 that accepts the power from the global power distribution network 34 and distributes it to the local networks 18, while also providing circuit protection for the region 14. Preferably the REEC 16 has a regional circuit protection device (not shown), such as a second fuse block. The second fuse block has a plurality of secondary circuit protection elements (not shown), such as a fuse, operably connected to it. In addition to providing circuit protection, the regional circuit protection device feeds the power to the local networks 18 and nodes 24 via the power wire 28 on the bus 26. It should be appreciated that the number of secondary circuit protection elements is dependent on the number of buses 26 contained within the region 14.

The regional power distribution network 50 also provides for regional grounding. The local networks 18 and nodes 24 are electrically grounded to the ground wire 30 on the bus 26. The REEC 16 is then grounded, using a method such as case grounding, to a sheet metal portion of the vehicle 12.

Figure 4:
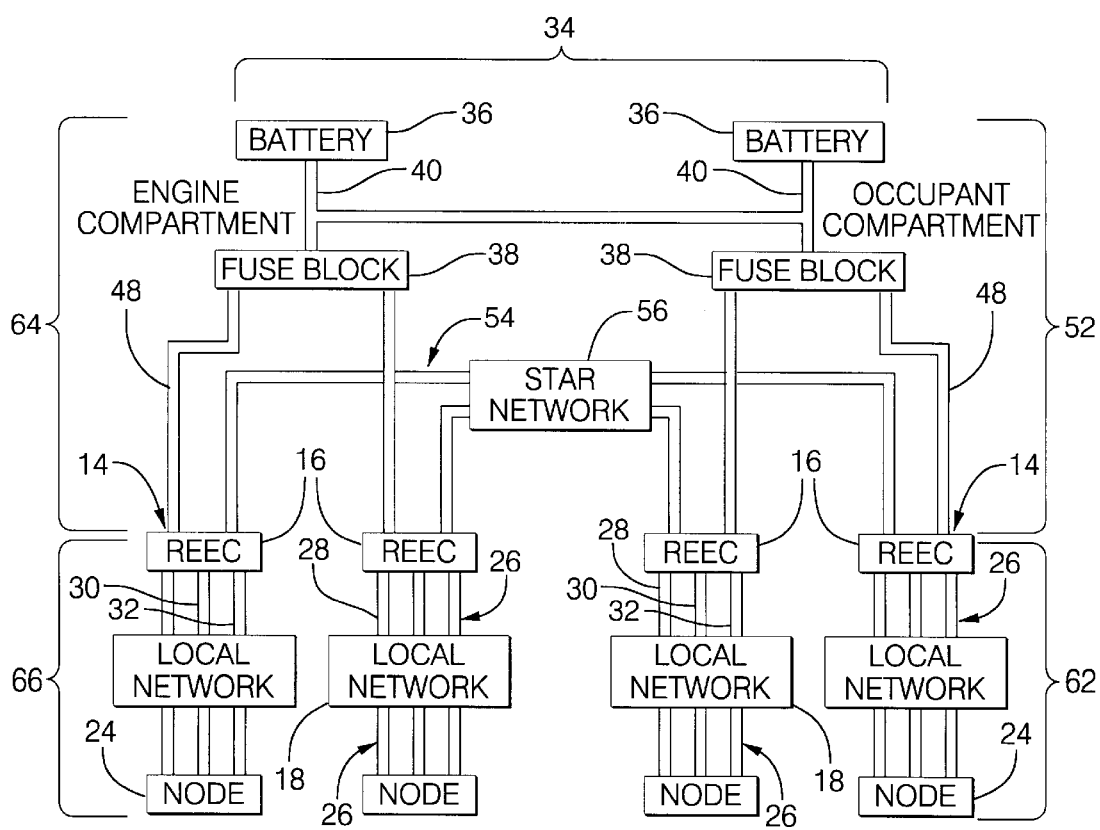
FIG. 4 is a block diagram of a communication network and computational network, according to the present invention, of the electrical/electronic system architecture of FIG. 1.
Figure 5:
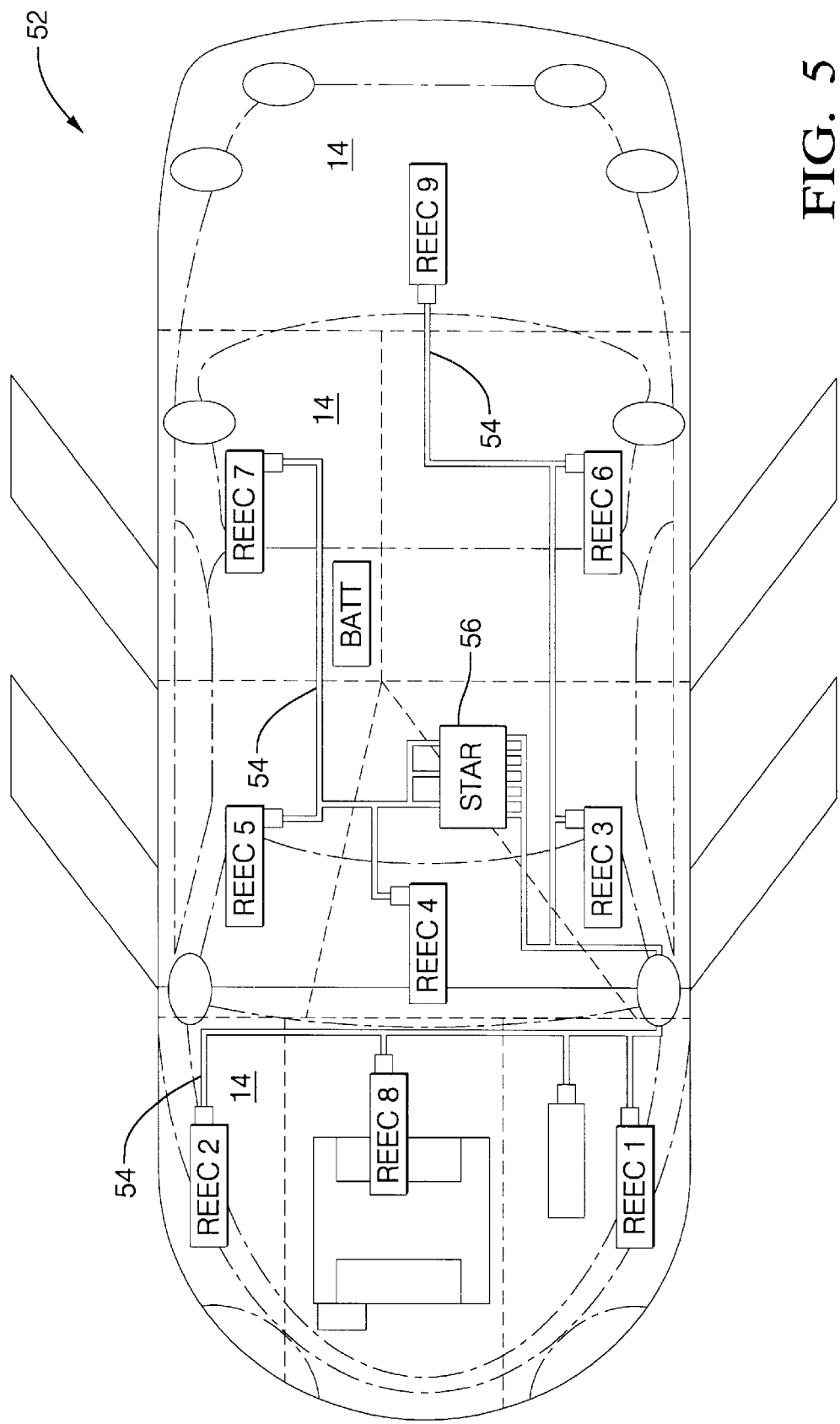
FIG. 5 is a top view of the communication network and computational network for the electrical/electronic system architecture of FIGS. 1 and 4, illustrated in operational relationship with the vehicle.

Referring to FIGS. 4 and 5 the electrical/electronic system architecture 10 also includes a global communication network 52 that provides serial communication between each region 14. The global communication network 52 includes the global communication line 54 that interconnects each region 14 to facilitate the transfer of data between regions 14. Advantageously, the data from one region 14 is shared with the other regions 14. Preferably, the global communication line 54 is a high-speed network to transfer large amounts of data. One type of high-speed network is a "star" network 56. For example, the "star" network 56 includes a star node (not shown). The star node includes a set of lines, including a transmit line (not shown) and a receive line (not shown) arranged in a star configuration. Preferably, the star node 56 includes a set of lines for each REEC 16. Data enters the star network 56 via one transmit line and is transmitted through the star to all of the receive lines. An example of a star network is disclosed in commonly assigned patents entitled, "Fiber Optic Star Coupler", U.S. Pat. No. 4,995,692 issued on Feb. 26, 1991 and "Fiber Optic Connector for Connecting A fiber Optic Harness to an Optical Device", U.S. Pat. No. 5,367,595 issued on Nov. 22, 1994.

The global communication line 54 interconnecting each region 14 may be an optical wire, capable of transferring over one million bits per second of data. Another example of a global communication line 54 is a twisted pair, which includes two standard copper wires twisted together, capable of transferring approximately 200,000 bits per second of data. While in this example the REECS 16 are interconnected, it is foreseeable that a stand alone microprocessor based module (not shown) could be connected to the global communication network 52, to access the data being transferred.

The electrical/electronic architecture 10 also includes a regional communication network 62 that receives and transmits shared global data, and distributes data communication within the local networks 18 and the nodes 24. The regional communication network 62 communicates with the local networks 18 via the data communication wire 32 on the bus 26. Preferably, the bus 26 is low speed to minimize cost. However, depending on the data requirements, there could be a mixture of high speed and low speed data transmission busses 26 within a region. It should be appreciated that a node 24 with a high-speed data transmission requirement could be directly wired to the REEC 16.

The electrical/electronic system architecture 10 includes a global computational network 64. The global computational network 64 distributes computed data from one region 14 to the rest of the regions 14 via the global communication line 54. The electrical/electronic system 10 also includes a regional computational network 66. The regional computational network 66 uses the REEC 16 within each region 14 to perform local calculations and functions based upon local inputs and outputs from the electrical/electronic features within that region 14. Global computing and functional performance may be directed by the REEC 16 within a particular region 14 or it may be requested by the REEC 16 in another region 14. An example of the flexibility of the electrical/electronic system architecture 10 is that a specific vehicle 12 level computation can be arbitrarily assigned to a specific REEC 16, or be variable depending on the availability of any REEC 16 during vehicle 12 operation.

Another example of the flexibility of the electrical/electronic system architecture 10 is that regional computing and functional performance may be dedicated within a particular region 14. With regards to a seat system (not shown), the local network 18 includes a switch to control a position of the seat and a seat motor. If the switch is energized, this information is communicated to the REEC 16 along the bus 26. The REEC 16 then determines the desired seat movement and communicates that functional movement to the seat motor via the bus 26. This locally specific activity takes place solely within one region 14, and requires no input from another region 14.

Referring to FIG. 6, the local networks 18 and nodes 24 may be connected to the bus 26 using a connection method known in the art as multi-drop construction 70. Advantageously, multi-drop construction 70 minimizes the hardware content of the electrical/electronic system architecture 10. The electrical/electronic device 20 may be categorized as one of three types, a multi-drop smart connector 72 combined with a dumb device 74; a multi-drop dumb connector 76 combined with a smart device 78; or a direct wired dumb connector 80 combined with a dumb device 74. A smart device contains electronics for more complex functions such as serial data communication or power switching. A dumb device does not contain the higher level functions of a "smart" device. It is foreseeable that a smart connector 72 can control multiple dumb devices 74. Preferably, the bus 26 is also connected to the REEC 16 using multi-drop construction 70. The connection between the bus 26 and REEC 16 can be a dumb connector 76 since the REEC 16 is a smart device.

Accordingly, the electrical/electronic system architecture physically partitions the vehicle into regions, and the regions into local networks to increase its flexibility. Further the electrical/electronic system architecture provides for both global and regional power distribution, data communication and computation.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An electrical/electronic system architecture for a motor vehicle comprising:
   a plurality of regions partitioning the vehicle, wherein each of said regions includes a regional electrical/electronic controller (REEC);
   at least one local network partitioning each of said regions, wherein each of said at least one local network includes an electrical/electronic device and a bus having a communication line communicating directly between the respective REEC and the electrical/electronic device of the at least one local network;
   a global power distribution network distributing power from a power source to said REEC within each of said regions;
   a regional power distribution system that distributes power from said REEC to said at least one local network, within said region;
   a global communication network that provides serial data communication between said REECs in each of said regions; and
   a regional communication network communicating with said global communication network, wherein said regional communication network provides data communication between said REEC and said local network within said region.

2. An electrical/electronic system architecture as set forth in claim 1 including a global computational network that distributes computational data between said REECS in each of said regions and a regional computational network communicating with said global computational network, wherein said regional computational network distributes computational data from said REEC to said at least one local network.

3. An electrical/electronic system architecture as set forth in claim 2 wherein said global computational network distributes computed data to each of said regions via said global communication network.

4. An electrical/electronic system architecture as set forth in claim 2 wherein said regional computational network performs computations in said REEC.

5. An electrical/electronic system architecture as set forth in claim 2 wherein said local network performs a function as directed by the REEC based upon said computational data.

6. An electrical/electronic system architecture as set forth in claim 1, wherein said global power distribution system includes a power source, a global circuit protection device, a first power feed electrically connecting said power source and said global circuit protection device and a second power feed electrically connecting said global circuit protection device with said REEC in each of said regions.

7. An electrical/electronic system architecture as set forth in claim 1, wherein said regional power distribution system includes a regional circuit protection device operably connected to said second power feed, and a power line operably connected to said regional circuit protection device that distributes power to said local networks.

8. An electrical/electronic system architecture as set forth in claim 1 wherein said at least one local network is grounded to said REEC within said region via a ground line.

9. An electrical/electronic system architecture as set forth in claim 1 wherein said global communication network is a high speed network that shares data from one region with each of said other regions through a global communication line.

10. An electrical/electronic system architecture as set forth in claim 9, wherein said high speed network is a star network.

11. An electrical/electronic system architecture as set forth in claim 9 wherein said global communication line is an optical wire.

12. An electrical/electronic system architecture as set forth in claim 9 wherein said global communication line is a twisted pair of wire.

13. An electrical/electronic system architecture as set forth in claim 1 wherein said regional communication network includes a data communication line between said REEC and said at least one local network, wherein said data communication line is bi-directional.

14. An electrical/electronic system architecture as set forth in claim 1 wherein said region is connected to said local network via the multi-line bus having at least a power line, a ground line and the data communication line.

15. An electrical/electronic system architecture as set forth in claim 1 wherein said at least one local network includes a node.

16. An electrical/electronic system architecture for a motor vehicle comprising;
 a plurality of regions partitioning the vehicle, wherein each of said regions includes a regional electrical/electronic controller (REEC);
 at least one local network partitioning each of said regions, wherein each of said at least one local network includes an electrical/electronic device;
 a global power distribution network distributing power from a power source to said REEC within each of said regions;
 a regional power distribution system that distributes power from said REEC to said at least one local network, within said region;
 a global communication network that provides high speed serial data communication between said REECs in each of said regions via a global communication line;
 a regional communication network communicating with said global communication network, wherein said regional communication network provides data communication between said REEC and said local network within said region;
 a global computational network that distributes computational data between said REECS in each of said regions using said global communication network; and
 a regional computational network communicating with said global computational network, wherein said regional computational network distributes computational data from said REEC to said at least one local network.

17. An electrical/electronic system architecture as set forth in claim 16 wherein said regional computational network performs computations in said REEC.

18. An electrical/electronic system architecture as set forth in claim 16 wherein said local network performs a function as directed by the REEC based upon said computational data.

19. An electrical/electronic system architecture as set forth in claim 16 wherein said global power distribution system includes a power source, a global circuit protection device, a first power feed electrically connecting said power source and said global circuit protection device and a second power feed electrically connecting said global circuit protection device with said REEC in each of said regions.

20. An electrical/electronic system architecture as set forth in claim 16, wherein said regional power distribution system includes a regional circuit protection device operably connected to said second power feed, and a power line operably connected to said regional circuit protection device that distributes power to said local networks.

21. An electrical/electronic system architecture as set forth in claim 16 wherein said at least one local network is grounded to said REEC within said region via a ground line.

22. An electrical/electronic system architecture as set forth in claim 16 wherein said regional communication network includes a data communication line between said REEC and said at least one local network, wherein said data communication line is bi-directional.

23. An electrical/electronic system architecture as set forth in claim 16 wherein said region is connected to said local network via a multi line bus having at least a power line, a ground line and a data communication line.

24. An electrical/electronic system architecture as set forth in claim 16 wherein said at least one local network includes a node.

25. An electrical/electronic system architecture as set forth in claim 24 wherein said local network is electrically connected to a multi-line bus using multi-drop construction.

* * * * *